United States Patent [19]

Carmichael, Jr.

[11] Patent Number: 5,089,809
[45] Date of Patent: Feb. 18, 1992

[54] REMOTE INDICATION OF APPLIANCE STATUS

[76] Inventor: Raymond T. Carmichael, Jr., 30 South Crescent Circuit, Brighton, Mass. 02135

[21] Appl. No.: 623,356

[22] Filed: Dec. 7, 1990

[51] Int. Cl.⁵ .......................... G08B 21/00; D06F 33/00
[52] U.S. Cl. .................................. 340/679; 68/12.01; 340/533
[58] Field of Search ............... 340/679, 664, 525, 533, 340/538, 539, 825.69, 825.72, 288, 310 A; 455/66-7, 53; 68/12 R

[56] References Cited

U.S. PATENT DOCUMENTS

| | | | |
|---|---|---|---|
| 3,334,340 | 8/1967 | McConnell | 340/679 X |
| 3,594,784 | 7/1971 | Femminella | 340/286.06 |
| 3,842,408 | 10/1974 | Wells | 340/679 X |
| 4,531,114 | 7/1985 | Topol et al. | 340/533 X |
| 4,916,439 | 4/1990 | Estes et al. | 340/679 |

Primary Examiner—Glen R. Swann, III.
Assistant Examiner—Thomas J. Mullen, Jr.
Attorney, Agent, or Firm—Robert K. Tendler

[57] ABSTRACT

Multiple remote appliance status modules are provided one each per apartment or condominium in a complex to indicate the status of, for instance, the washing machine or dryer, with AC wiring utilized to transmit the status information in parallel to all remote modules, and with the remote module being pulled into an AC socket within each appartment or condominium. In order to identify the washing machine by floor, transmitting apparatus at each washing machine is provided with a predetermined code transmitted to all remote modules. All remote indicating modules associated with the given washing machine are provided with decoding apparatus for the predetermined code of the associated washing machine such that only remote indicating modules associated with a particular washing machine are activated to indicate its status or use. In one embodiment, a current sensor is utilized to sense when current is drawn by the particular device, with the current sensor detecting an in-use or out-of-use condition of the particular appliance. Such coded transmissions may be used in the single house-single washing machine embodiments to prevent status indications from one household interfering with status indications at a second household.

11 Claims, 4 Drawing Sheets

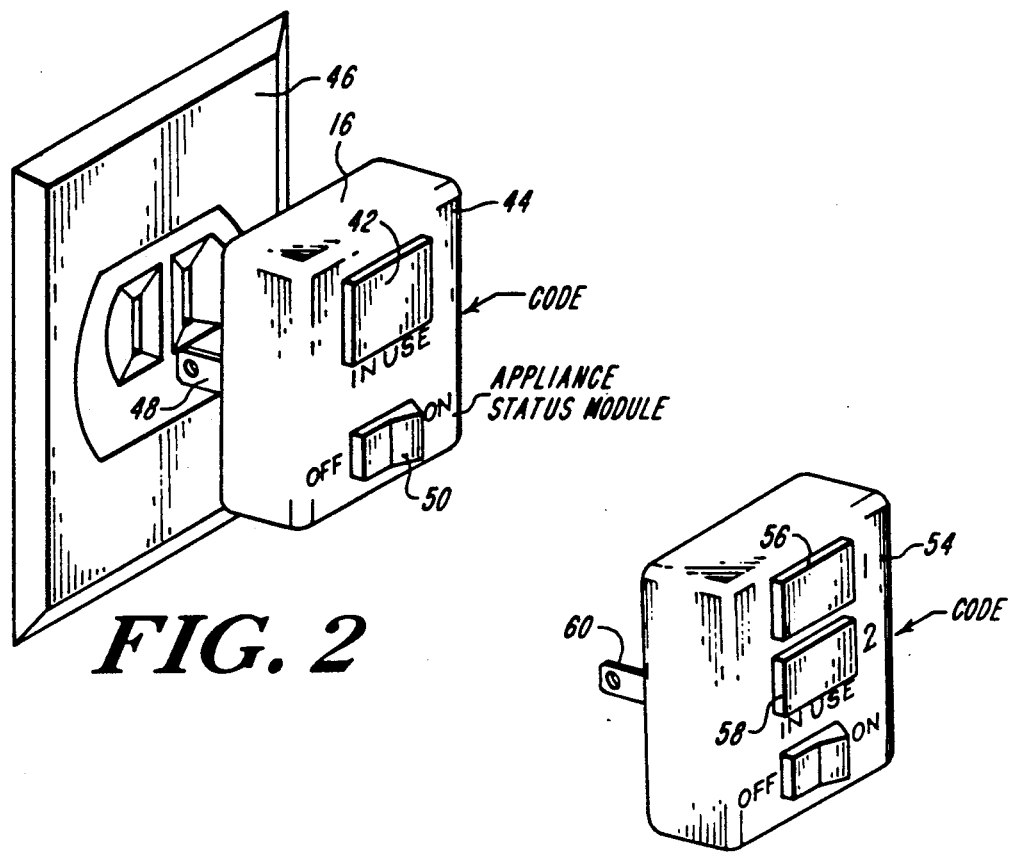
FIG. 2
FIG. 3
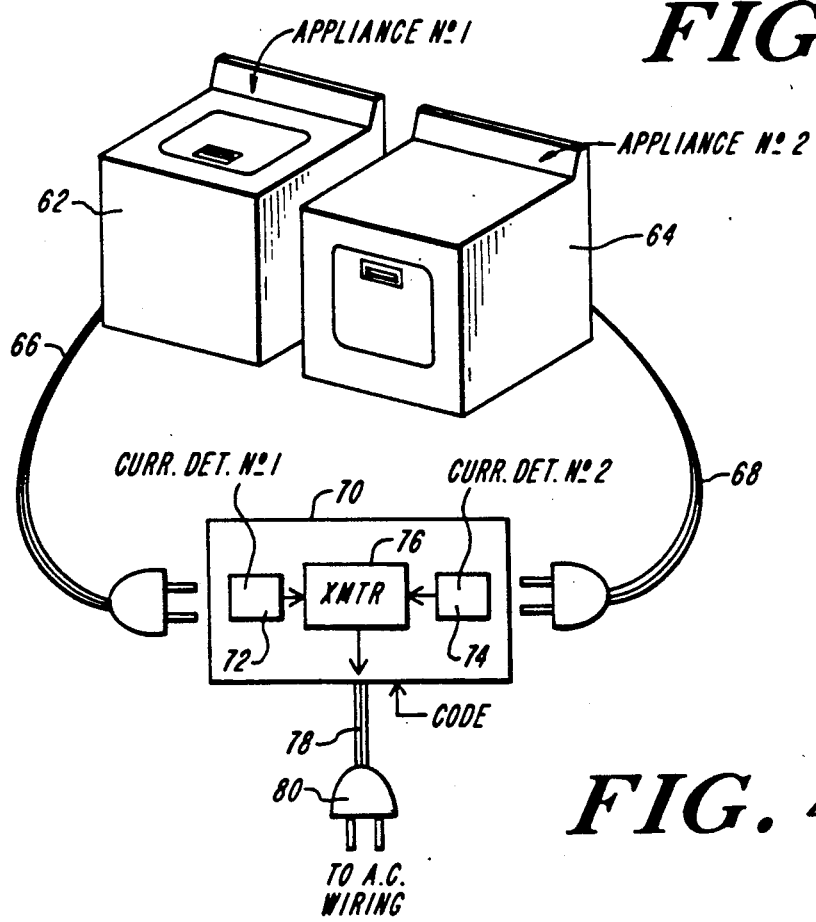
FIG. 4

REMOTE INDICATION OF APPLIANCE STATUS

FIELD OF INVENTION

This invention relates to remote indication of the status of appliances and more particularly to the utilization of groups of remote status indicating modules distributed throughout a multi-unit housing complex.

BACKGROUND OF THE INVENTION

While remote indication of appliance status is well-known, as well as the signalling of appliance status over internal AC wiring of a dwelling, prior signalling systems do not address the problem of multiple remote indicating modules or the problem of providing parallel indications to one group of remote modules, while excluding another group of remote modules.

The problem of multiple indicators arises in the apartment house or condominium context in which a number of individual apartment or condominium units share the use of a single washing machine, dryer, or other appliance. As is often the case in large apartment complexes a washing machine or dryer is provided for each floor of the complex. Because there are not enough washing machines to match the number of units on the floor, there is a necessity for providing each unit on the floor with an indication as to whether the machine is in use or not, so as to save the occupant a useless trip to the machine.

Prior art remote appliance status systems such as illustrated in U.S. Pat. No. 4,916,439, 3,842,408; 3,594,784; and 3,334,340 are all limited to a single indicator for use in determining the in-use status of the appliance.

As such, they are not readily adaptable multi-unit complexes. Moreover, none of the above patents, save U.S. Pat. No. 4,916,439 teach a simple method for determining the status of an appliance by externally sensing the current of the appliance outside of the case or housing of the appliance.

Moreover, it will be appreciated that in order to provide a universal indication system applicable to different manufacturers, it is important to be able to retrofit appliances without having to rewire the appliance.

The aforementioned U.S. Pat. No. 4,916,439 solves this problem by providing a current detector for detecting by the amount of current drawn, whether or not a load has been coupled to the AC line, and thus whether the machine is in use. However, in this system the output of the current detector is coupled to an RF transmitter for radioing the status via an RF link to a single remote indicator. No attempt is made in this system to transmit appliance status information over AC lines, much less to multiple remote indicators.

There is thus a need for a simple, easily retrofitable system for providing a multi-unit dwelling with the ability for the occupants to know when a commonly shared appliance is in use. It is also important that when more than one appliance is provided, the status of this appliance be provided only to a limited group of users even though common AC wiring of the dwelling is used.

SUMMARY OF INVENTION

In order to accomplish the remote indication of the status of an appliance, each of the appliances is provided with a coded transmission system in which coded signals representing the status of the appliance are applied to the AC wiring for the whole complex.

A remote status indicating module is located in each one of the units of the complex and is connected to the AC wiring by virtue of an AC electrical socket within the unit. Thus, the remote status indicating module may be located anywhere within the unit that is convenient. Each of the remote modules is provided with detecting circuitry, not only for detecting the status of the particular appliance involved but also the particular code generated at the appliance. This enables the separation of the remote modules into groups associated with the appliances. In a typical situation, remote modules are grouped by floor, assuming that the appliance is commonly shared by the units of that floor. In this manner, all signalling is applied in parallel to all of the remote modules, with the modules being effectively grouped by the transmitted codes from each of the individual appliances.

In one embodiment, the states of the particular appliance is detected by a current sensing circuit external to the appliance which provides an output to a transmitter having a unique code associated therewith. The output of the transmitter is applied directly to the AC wiring of the complex, in one embodiment through a superimposed RF signal. The utilization of the AC wiring provides a fail safe mechanism, as opposed to through-the-air RF transmission which is subject to false indications as well as multi-path disturbances, with the coded transmission automatically grouping the multiple remote modules as desired.

While the subject system is described as being appropriate for groupings having to do with individual floors of a complex, it will be appreciated that it is within the scope of this invention that any type of grouping of multiple remote status indicating modules is possible.

It will also be appreciated that the subject system, while it is applicable to complexes having multiple units is utilizable in the case where an individual dwelling is provide with a single appliance and a single remote sensing unit. In this case, assuming that multiple dwellings are coupled to the same AC power line after an isolation transformer, the unique coding assures that only the remote module or modules within one household are responsive to the appliance within that household.

In summary, throughout an apartment complex or condominium complex in which each floor of the complex is provided with washing machine apparatus, multiple remote status indicators or modules are provided one each per apartment or condominium to indicate the status of the washing machine or dryer. More particularly, AC wiring is utilized to transmit the status information in parallel to all remote indicating units, with the remote modules being plugged into an AC socket within the apartment or condominium. Washing machine status is therefore provided in parallel to all remote modules. In order to identify the washing machine by floor, transmitting apparatus at the washing machine is provided with a predetermined code or identification number, which code is transmitted to all remote indicating units. All remote modules on the floor associated with the given washing machine are provided with decoding apparatus for decoding the predetermined identification number of the associated washing machine such that only remote modules associated with a particular washing machine are activated to indicate its status or use. In one embodiment, a current sensor is utilized to sense whether current is being drawn by the particular device, with the current sensor detecting an in-use or out-of-use condition of the particular appliance. A signal representing status is coupled to a transmitter which generates a unique code, with the transmitter applying the coded signal to the AC wiring. Coded transmissions over AC wiring are also useful in the single house/single washing machine embodiments to prevent status indications from one household interfering with status indications at a second household.

BRIEF DESCRIPTION OF DRAWINGS

These and other features of the subject invention will be better understood taken in conjunction with the detailed description and the drawings of which:

FIG. 2 is a diagrammatic representation of the appliance status module of FIG. 1;

FIG. 3 is a diagrammatic representation of an alternative module for indicating the status of more than one appliance within a group;

FIG. 4 is a diagrammatic representation of two appliances and their connection via a transmitter to the AC wiring, with the appliances to be monitored by the module of FIG. 3;

DETAILED DESCRIPTION

Figure 1:
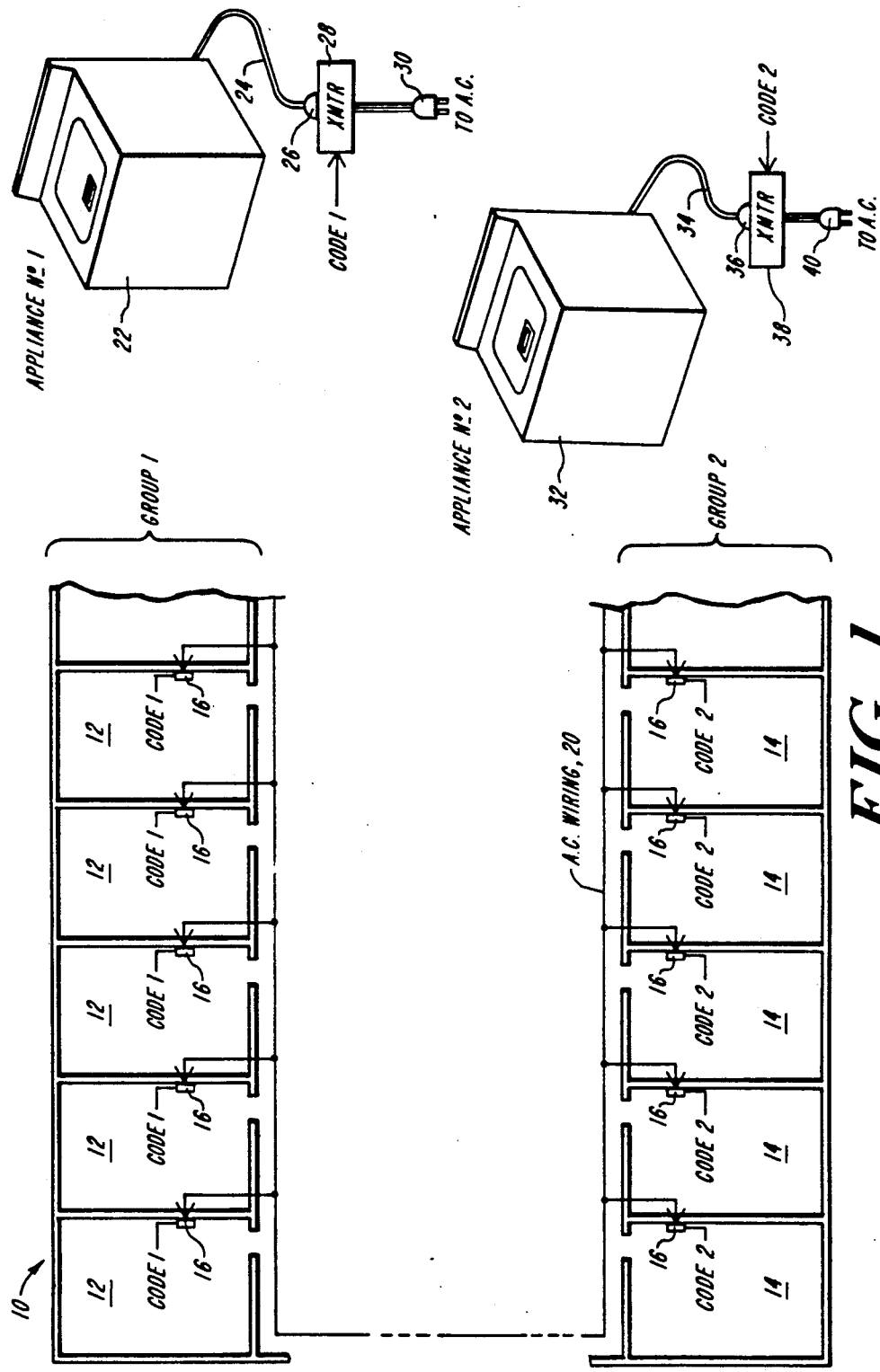
FIG. 1 is a schematic and diagrammatic representation of the subject appliance status module system, illustrating groupings according to appliance, and showing multiple status modules connected to the appliance via the AC wiring of the condominium or apartment complex.

Referring now to FIG. 1, an apartment or condominium complex 10 is shown having units 12 on a first floor and units 14 on a second floor, with each unit being provided with a plug-in module 16 which is adapted to be plugged into any electrical socket within the unit. The electrical sockets are all interconnected in parallel via the AC wiring 20 of the complex, with the modules associated with group 1, those in units 12, being provided with a first predetermined or unique code, and with the modules associated with the second group of units, namely units 14, being provided with a second unique code.

As illustrated to the right of this diagram, an appliance 1, here labelled with reference character 22, is coupled via its own power cord 24 and plug 26 to a transmitter 28 which is in turn plugged in at plug 30 to the AC wiring of the complex. Likewise, a second appliance here illustrated by reference character 32 is coupled by its power cord 34 through its plug 36 to its transmitter 38, which is in turn coupled via its plug 40 to the AC wiring of the complex.

It is the purpose of transmitters 28 and 38 that upon detection of a predetermined condition of the appliance, a signal representing this condition is transmitted to the remote status modules, along with a code uniquely identifying the particular appliance involved.

As will be seen, the transmitters may be provided with current detectors for detecting the on/off condition of the appliance by virtue of its current draw, with the existence of the current draw being provided in terms of the generation of a digital pulse sequence applied to the AC wiring, along with a pulse sequence corresponding to the unique code associated with the appliance.

In this way a grouping of those modules which respond to the predetermined code is established.

The predetermined code may be loaded into the transmitter via DIP switches to be described. Respective individual appliance status modules can also be provided with an appropriate code via DIP switches. This provides for extremely easy coding and grouping of the nodules with respect to the appliance they are monitoring.

One such appliance status module is illustrated in FIG. 2 to include a light emitting indicator 42 mounted through a housing 44 which is to be plugged into a corresponding socket 46 via prongs 48. In one embodiment the indicator 42 is a LED device which is powered, along with the circuitry within the module, via AC current from the outlet. The module is also provided with an on/off switch as illustrated.

In operation, when a particular appliance is on, it draws current which is detected at transmitter 28 or 38. Upon the detection of current above a predetermined threshold, the associated transmitter transmits a distinctive signal which is applied to the AC wiring. This distinctive signal indicates both the status of the appliance and also its unique identification code. The group of modules assigned this predetermined code, detect not only these coded signals but also the status code, at which time the appropriate indicators on the modules are activated to indicate the status of the associated appliance.

Thus, multiple remote status indicator modules are effectively grouped with respect to the monitored appliance so that, in the case of washing machines, individuals in the various apartment units can ascertain by looking at the plug-in monitor whether or not the washing machine is in use or not. This provides the occupants of the unit with an easy wireless indicator of appliance status.

Referring now to FIG. 3, an appliance status module 54 is illustrated as indicating the status of two appliances here shown by indicators 56 and 58. The module is provided with prongs 60 adapted to be plugged into a receptacle within the apartment unit.

Referring to FIG. 4, this module monitors the status of, for instance, a first appliance 62 which may be a washing machine, whereas it also can monitor the status of a second appliance 64 which may be, for instance, a dryer. Each of these two units have respective 1 power cords 66 and 68 which are plugged into a transmitter 70. This transmitter is provided with associated current detectors 72 and 74 which are coupled to a signal generator 76 that is in turn coupled to apply the appropriate signals over power cord 78 to plug 80 which is in turn coupled to the AC wiring of the complex.

In this embodiment, a predetermined code 81 is provided to identify this group of appliances, with the signal generator generating coded signals corresponding to the status of either the first or second appliance, or both.

Figure 5:
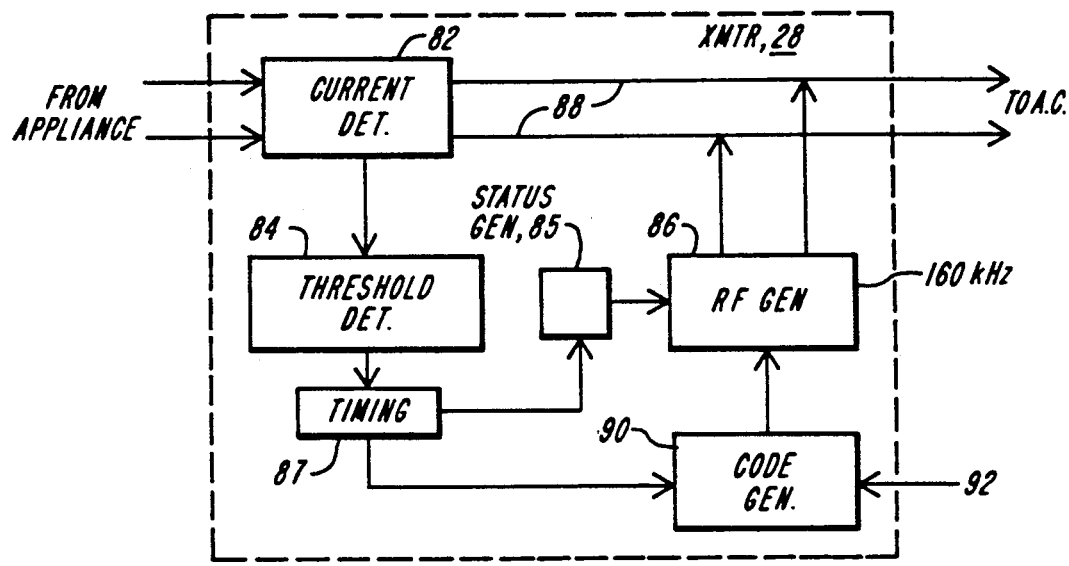
FIG. 5 is a block diagram of the transmitter of FIG. 1, illustrating the impression of coded signals on the AC line in response to the output of a current detector.

Referring now to FIG. 5, transmitter 28 is illustrated as including a current detector 82 coupled to a threshold detector 84 which is in turn coupled to an RF signal generator 86 in one embodiment operating at 160 kilohertz. The output of the RF signal generator is applied to lines 88 which are adapted to be coupled to the AC wiring through the appropriate AC socket. A code generator generally illustrated at 90 is utilized to modulate the RF signal generator with a predetermined code which is settable as illustrated by arrow 92.

In operation, when current is drawn through current detector 82 with the appliance being coupled to AC power, threshold detector 84 is tripped to generate a pulse coupled to status generator 85 through a timer 87. Prior to the activation of status generator 85, a signal is applied to code generator 90, and with appropriate timing developed by timer 87. RF signal generator 86 is modulated first with the unique code associated with the transmitter and subsequently with a signal representing the status of the monitored appliance as provided by status generator 85.

Figure 6:
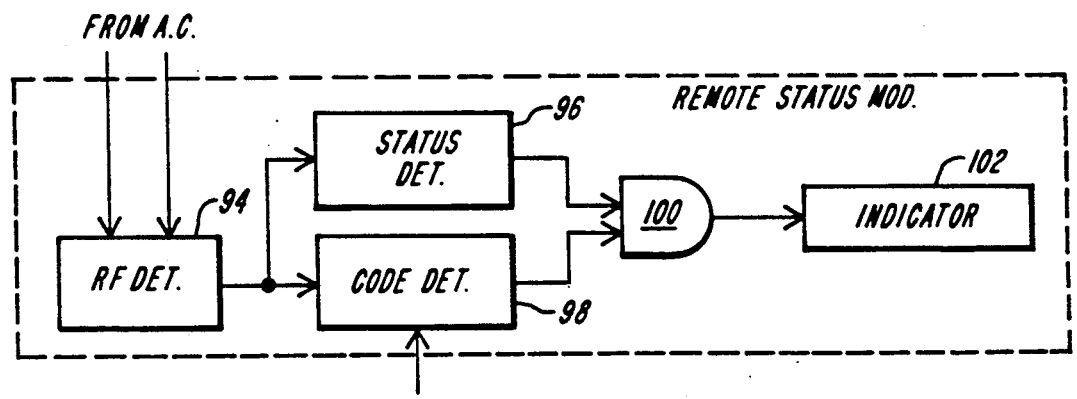
FIG. 6 is a block diagram illustrating the remote status module of FIG. 1, illustrating the detection of the RF signal coupled to the AC line, and also indicating both a code detection unit and a status detection unit, the outputs of which when simultaneously present are utilized to activate an indicator; and, FIG. 7 is a more detailed block diagram illustrating one embodiment of the subject invention in which programmable encoders and decoders are utilized in combination with an FM modulation and demodulation system for use with RF generators and FM detectors.

Referring now to FIG. 6, from the remote modules point-of-view, an RF detector 94 detects the RF signals and provides a resultant signal to a status detector or demodulator 96 along with a code detector or demodulator 98. In the simple case where the monitor only detects the on/off condition of an appliance, an output signal from the code detector simultaneous with the output from the status detector through an AND gate 100 activates an indicator 102 to provide the on/off appliance indication.

Figure 7:
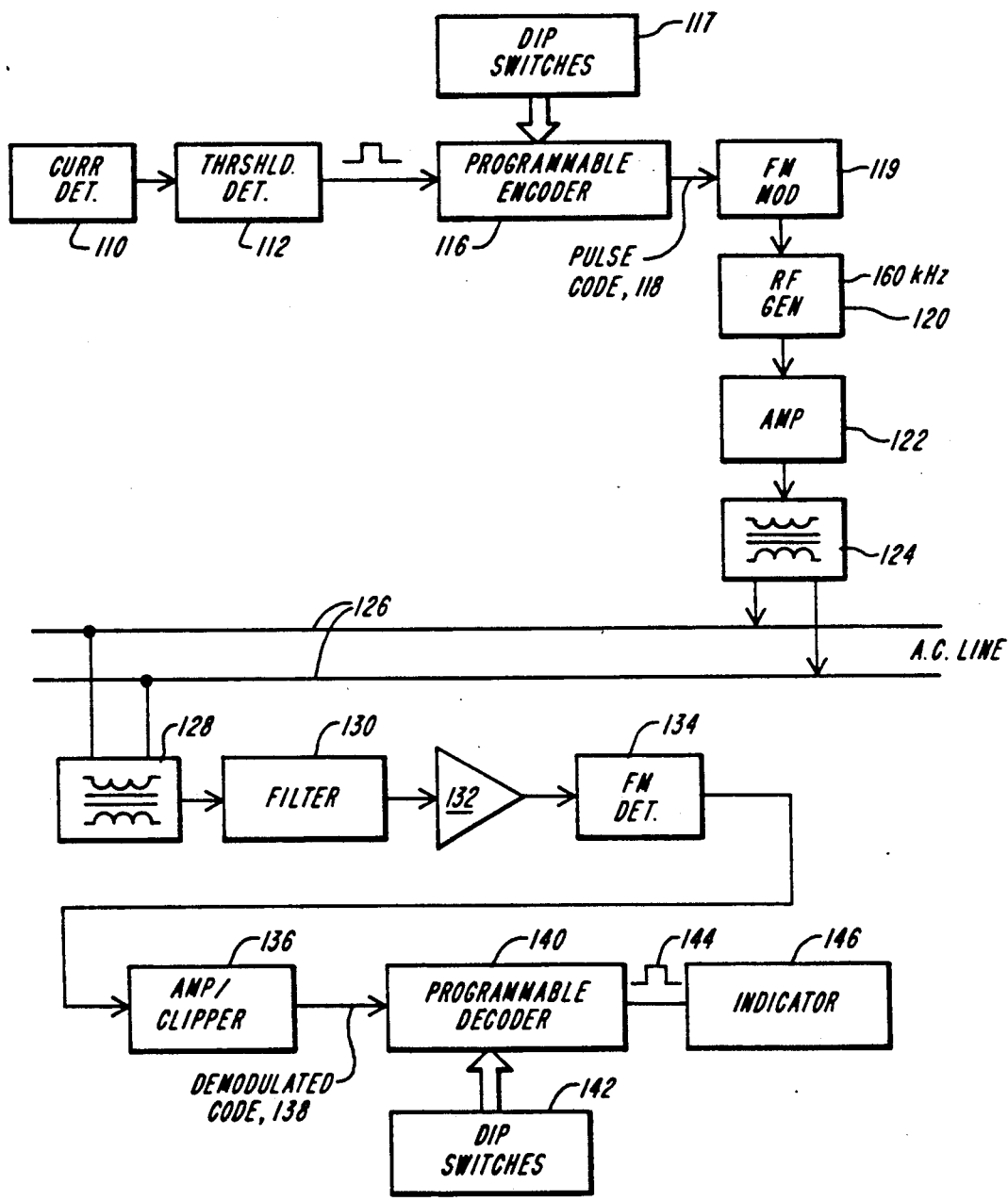

Referring now to FIG. 7, more specifically, in one embodiment a current detector 110 is coupled to a threshold detector 112 which provides a pulse 114 to a programmable encoder 116 when sensed current is above a predetermined threshold.

Programmable encoder 116 is available from Supertext, Inc. as model ED-15 which is a programmable data encoder. The particular programming code is set by DIP switches 117, with the output of the encoder being a 15 bit pulse code 118, applied to an FM modulator 118 which is in turn coupled to an RF signal generator 120 that produces an RF signal at 160 kilohertz in one embodiment. This signal is amplified at 122 and is provided to a transformer 124 which applies the coded signal to AC lines 126.

At the remote location a transformer 128 is coupled to the AC line, and the output of which is filtered at 130 to remove AC and transient components, with the output of filter 130 being amplified at 132 and coupled to a conventional FM detector 134. The output of this detector is provided to an amplifier clipper circuit 136.

Demodulated code is available at 138 and is provided to a programmable decoder 140 available as Supertext, Inc. model ED-11. The code to which the decoder will respond is set by DIP switches 142, which are set such that when the appropriate code is received and an appropriate signal 114 is generated, as illustrated at 144, the pulse is utilized to activate indicator 146. Indicator 146 may be either audible or visible, or both.

In operation, the programmable data encoders and decoders provide for the encoding of a signal upon receipt of an activation signal such as illustrated by signal 114. Upon receipt of the coded signal at the remote module, the decoder responds to the code by outputting the same type of pulse as utilized to activate the programmable encoder at the appliance.

It will be appreciated that various types of status signals can be generated in this fashion so as to be able to actuate groups of indicators in accordance with the monitored appliance or other piece of apparatus.

Having above indicated a preferred embodiment of the present invention, it will occur to those skilled in the art that modifications and alternatives can be practiced within the spirit of the invention. It is accordingly intended to define the scope of the invention only as indicated in the following claims;

I claim:

1. A modular appliance status system coupled to A.C. wiring of a building, comprising:
    means at a predetermined appliance for applying both a signal indicative of the status of said appliance and a signal code uniquely identifying the appliance to said A.C. wiring; and
    a plurality of receiver modules each adapted to be connected to said A. C. wiring at different locations within said building, a selected group of receiver modules having means responsive to both a predetermined signal code associated with said appliance and said status signal for indicating the status of said appliance, whereby groups of receiver modules can be made responsive to different appliances.

2. The system of claim 1 wherein said status includes the on/off status of said appliance.

3. The system of claim 2 wherein said signal applying means includes means for sensing the A.C. current to said appliance and means for applying said signals to said A.C. wiring responsive to current flow to said appliance.

4. The system of claim 1 wherein each group of receiver modules is on a different floor of said building, thereby to group appliances with respect to floor.

5. The system of claim 1 and further including first and second appliances at a first location and means at said first location for sensing the status of each of said first and second appliances and for applying different signals to said A.C. wiring responsive to the respective status of said first and second appliances, said receiver modules each including means for detecting said different signals and for indicating the respective status of said first and second appliances responsive thereto.

6. The system of claim 1 wherein said indicating means includes visual status indicating means.

7. The system of claim 1 wherein said indicating means includes audio status indicating means.

8. The system of claim 1 wherein said signal applying means includes a programmable encoder, an FM modulator coupled to said encoder, an RF generator coupled to said FM modulator and means for applying the output of said RF generator to said A.C. wiring.

9. The system of claim 8 wherein each of said receiver modules includes an FM detector coupled to said A.C. wiring, a programmable decoder coupled to said FM detector and an indicator coupled to said decoder.

10. The system of claim 1 wherein said signal applying means includes a current detector at said appliance; a threshold detector coupled to said current detector for providing an output signal when said detected current exceeds a predetermined threshold; a timing circuit coupled to the output of said threshold detector for providing at least two timed sequential output pulses responsive to an output from said threshold detector;

status and, code generators coupled respectively to different ones of said output pulses for generating respective modulating signals; an RF generator modulated by said modulating signals; and means for coupling the output of said RF generator to said AC wiring.

11. The system of claim 10 wherein each receiver module includes RF detecting means coupled to said AC wiring; status and code detectors coupled to said RF detector for generating respective pulses upon detection of a predetermined status and code; an indicator; and means for actuating said indicator responsive to output pulses from both said status detector and said code detector.

* * * * *